United States Patent
Snyder

[15] 3,696,189
[45] Oct. 3, 1972

[54] STABILIZED ANTIBIOTIC AND METHOD

[72] Inventor: Frank M. Snyder, 2043 N. 53rd St., Omaha, Nebr. 61084

[22] Filed: May 18, 1970

[21] Appl. No.: 38,562

[52] U.S. Cl. ..........................424/38, 99/2, 424/227
[51] Int. Cl. ....................A61k 21/00, A61k 27/12
[58] Field of Search ..............99/2 AB; 424/38, 227

[56] References Cited

UNITED STATES PATENTS

| | | | |
|---|---|---|---|
| 3,538,215 | 11/1970 | Snyder et al. | 424/38 |
| 2,875,130 | 2/1959 | Grass et al. | 424/38 X |
| 2,805,977 | 9/1957 | Robinson et al. | 424/38 X |
| 3,108,046 | 10/1963 | Harbit | 424/38 X |
| 3,279,998 | 10/1966 | Raff et al. | 424/38 X |
| 3,344,029 | 9/1967 | Berger | 424/19 |
| 2,902,407 | 9/1959 | Gross et al. | 424/38 |
| 2,890,980 | 6/1959 | Hotchkiss et al. | 424/38 X |
| 3,078,216 | 2/1963 | Greif | 424/38 X |
| 3,374,146 | 3/1968 | Bucharz et al. | 424/19 |

*Primary Examiner*—Shep K. Rose
*Attorney*—McDougall, Hersh & Scott

[57] ABSTRACT

A stabilized antibiotic premix composition comprising antibiotic particles admixed with edible carrier particles wherein at least the antibiotic particles are coated with a thin layer of at least one glyceride.

5 Claims, No Drawings

STABILIZED ANTIBIOTIC AND METHOD

This invention relates to stabilized antibiotics, and more particularly to stabilized antibiotic premix compositions for use with animals.

Various antibiotics including tetracycline and derivatives thereof, such as chlortetracycline, oxytetracycline as well as a variety of others have been commercially used for growth stimulation and effective disease control in animals, and particularly ruminants, such as cattle. These antibiotics are generally commercially available in comparatively low concentrations in an antibiotic premix composition formulated of the antibiotic admixed with an edible carrier, such as soybean meal. Such premixes are generally administered to animals by admixing the premix with various nutritional feedstuffs to form a feed supplement composition and feeding the resulting feed supplement composition to the animals.

Feed supplement compositions containing antibiotics can be either in liquid or solid form. However, in either case, it has been found that there is a marked tendency for the antibiotics to lose their potency upon exposure to a variety of components frequently found in such feed supplement compositions, including minerals, vitamins, phosphate, urea, etc. and upon exposure to heat, moisture and environments having a relatively high pH.

The mechanism for this loss in potency is not fully understood at the present time. However, it is known that the loss of potency is particularly severe in cases of antibiotics which are subjected to elevated temperatures, as during a pelletizing operation, and in close association with minerals, phosphate and urea which are frequently featured in feed supplements.

It is accordingly an object of the present invention to produce and provide a method for producing a stabilized antibiotic.

It is another object of the present invention to produce and to provide a method for producing antibiotics and antibiotic premix compositions having improved stability against the effects of minerals, vitamins, phosphate, urea, heat and moisture for use in ruminant feed supplement compositions.

It is yet another object of the present invention to produce and to provide a method for producing an animal feed supplement composition containing an antibiotic having improved stability.

The concepts of the present invention reside in an antibiotic in which the antibiotic particles have been coated with a material which operates to protect the antibiotic against the deleterious effects of elements present in the atmosphere, moisture as well as minerals, vitamins, urea, phosphate and the like, but which does not interfere with the normal digestive processes of the animals to which the antibiotic is administered.

In accordance with the practice of the present invention, antibiotic particles are coated with one or more glycerides to stabilize the antibiotic against the deleterious effects of materials contained in feed supplement compositions. As used herein, the term "glyceride" is intended to mean and include the mono-, di- and triglyceride esters formed of glycerol and one or more fatty acids containing eight to 30 carbon atoms, as represented by lauric, stearic, myristic, palmitic, oleic, linolenic, linolic and octadecatrienoic acid as well as a variety of others. It has been found that such glycerides provide a protective coating on the antibiotic particles which protects the antibiotic against biological degradation without deleterious effect on the antibiotic.

The foregoing glycerides are generally found in a variety of vegetable oils including corn oil, soya oil, linseed oil, peanut oil, sesame oil, grapeseed oil, poppy seed oil and a wide variety of others. Therefore, it is frequently preferred to make use of one or more of the foregoing oils as a source of the glyceride in accordance with the practice of the present invention.

The antibiotic particles can be conveniently coated with one or more glyceride by simply admixing the antibiotic particles with the glyceride at a temperature sufficient to insure that the glyceride is in a fluid state to thereby provide for thorough coating of the antibiotic particles. While it is possible to coat individual antibiotic particles prior to their incorporation into a premix composition containing an antibiotic admixed with an edible carrier, it is frequently preferred to coat the individual particles of an antibiotic-containing premix composition so as to coat both the antibiotic particles and the edible carrier particles, since antibiotics are frequently commercially available in the form of such premix compositions. However, it should be understood by those skilled in the art that only the antibiotics need be coated with one or more of the glyceride oils in order to obtain the advantages of the present invention.

The quantity of glyceride admixed with the antibiotic particles or antibiotic premix composition is not critical, and can be varied within wide ranges. In general, it is desirable to use no more of the glyceride than is necessary to completely coat the antibiotic particles with the glyceride. It has been found that best results are obtained when the antibiotic particles contain a glyceride coating which constitutes between 0.1–25 percent by weight of the coated antibiotic particles. However, it will be appreciated by those skilled in the art that the amount of oil added to an antibiotic admixed with an edible carrier in the form of a premix will vary between wide ranges, depending somewhat upon the absorptivity of the edible carrier component of the premix composition. Thus, in coating an antibiotic admixed with an edible carrier, it is generally desirable to incorporate 1–100 parts by weight of the glyceride per 1 part of the antibiotic contained in the premix, and preferably 1–50 parts by weight glyceride per part antibiotic contained in the premix. Since most commercially available antibiotic-containing premix compositions contain between 10–150 parts by weight of antibiotic per 500 parts of the composition, it is generally sufficient to employ between 0.1–10 parts by weight of the glyceride per part of premix composition. The temperature of the oil during the coating operation is preferably at least 40° F. to insure the desired fluidity as described above.

In formulating the coated antibiotic-containing premix compositions in a liquid feed supplement composition, it is frequently desirable to form a slurry of the antibiotic or premix composition in oil which can be mixed with the liquid feed supplement composition to form a suspension of the coated antibiotic and edible carrier particles in the liquid supplement mix. When formulating the coated antibiotic particles into a liquid feed supplement composition, it is desirable to introduce an emulsifying agent to the slurry of the antibiotic in oil prior to admixing the slurry with the liquid feed supplement composition.

A wide variety of emulsifiers may be used for this purpose. In general, the emulsifier contemplated for use in accordance with the concepts of the present invention are pharmaceutically acceptable emulsifying agents which have no deleterious effects upon animals, and particularly ruminant animals. Particularly preferred is polysorbate 80 which is a mixture of esters of oleic acid with sorbitol and their mono- and dianhydrides having an acid value below 7.5 and which has been condensed with approximately 20 moles of ethylene oxide per mole of sorbitol. Such emulsifiers are commercially available under the tradename Tween 80. However, a wide variety of other emulsifiers may be used, such as Atmus 300 from Atlas Chemical Company as well as a wide variety of other emulsifying agents formed by the condensation of polyoxyethylene with esters of fatty acids. In general, the amount of emulsifier used is preferably within the range of 2–20 percent of the antibiotic-containing slurry.

The coated antibiotic particles are often formulated into a solid feed supplement composition. For this purpose, the slurry of the coated antibiotic or antibiotic-containing premix composition in the glyceride is absorbed on a carrier or absorbent. Use can be made of a carrier which is neither strongly acidic or basic to avoid harmful effects upon the antibiotic due to prolonged contact with the carrier. As the carrier, use can be made of diatomaceous earth, such as Celite 21 marketed by Johns-Manville, although a variety of other carriers having a high surface area can be used. Representative of such other carriers are Attapulgite clay, Bentonite clay and kaolin clay.

The amount of the carrier incorporated with the slurry is not critical and should be an amount sufficient to absorb the oil in the slurry so as to give the antibiotic a substantially dry appearance and feel whereby the resulting mixture of the antibiotic or antibiotic-containing premix and the inert carrier is free flowing. In this manner, the resulting composition is capable of being pelletized for use in the preparation of a solid feed supplement. The inert carrier is believed to adhere to the oil coated antibiotic particles to form a layer thereon. Thus, the double coated particles are capable of resisting the high temperatures frequently involved in pelletizing operations without adverse effects upon the biological activity of the antibiotic per se.

For best results, the amount of the inert carrier incorporated with the coated antibiotic should be an amount within the range of 0.1–10 percent by weight, and preferably 1–5 percent by weight.

The concepts of the present invention are applicable to a wide variety of antibiotics which have a tendency to lose their biological activity upon exposure to heat, moisture, mineral and various other materials, such as urea. In general, the concepts of the present invention are applicable to tetracycline as well as derivatives thereof, such as chlortetracycline, bromotetracycline, oxytetracycline, as well as the acid and basic salts thereof. Also contemplated within the scope of the present invention is bacitracin and its salts, such as zinc or manganese bacitracin.

Having described the basic concept of the present invention, reference is now made to the following examples, which are provided by way of illustration, and not by way of limitation, of the practice of the invention.

EXAMPLE 1

A make up vessel provided with a steam jacket and an agitator is charged with approximately 200 grams of soya oil and steam is fed to the jacket to heat the oil to a temperature of about 50° F. About 150 grams of a commercial antibiotic premix (Klortet from Dawe's Laboratories) containing about 100 grams of chlortetracycline per pound admixed with a soybean meal type edible carrier is introduced, and the resulting mixture is agitated to form a slurry of the antibiotic and edible carrier. Stirring is continued and about 5 grams of a surfactant (Tween 80) is added.

Then an appropriate amount of the mixture is slowly added to 2,000 lbs. of a liquid ruminant feed supplement to provide the following composition:

| | |
|---|---|
| Molasses | 1000.0 lbs. |
| Urea(dry) | 315.0 lbs. |
| NaCl | 100.0 lbs. |
| Na₂SO₄ | 100.0 lbs. |
| Water | 341.8 lbs. |
| Trace minerals | 2.6 lbs. |
| Ammonium polyphosphate | 140.0 lbs. |
| Chlortetracycline(100%) | 0.6 lbs. |

The stability of the antibiotic in the foregoing composition is tested at various temperatures for varying periods of time. The results of the tests are shown in the following table. The stability of the chlortetracycline is expressed in percent retention of biologically active material in the chlortetracycline. The analyses for antibiotic activity were performed by well known biological assay methods, such as those described in *Methods of Analysis of the Association of Official Agricultural Chemists*, Tenth Edition, 1965.

TABLE I

| Storage Time(days) | Retention of biologically active material | | |
|---|---|---|---|
| | 69°F | 97°F | 40°F |
| 7 | 97 | 94 | 98 |
| 14 | 97 | 87 | — |
| 21 | 91 | 74 | 97 |
| 28 | 87 | — | — |
| 35 | 82 | — | — |

The same composition is again prepared except that the soya oil is omitted. The stability of the chlortetracycline is shown in the following table.

TABLE II

| Storage time(days) | Retention of biologically active material | | |
|---|---|---|---|
| | 69°F | 97°F | 110°F |
| 3 | 84 | 81 | 79 |
| 6 | 63 | 54 | 50 |

As is evident from the foregoing, the use of antibiotics which have been provided with a coating of a glyceride in accordance with the present invention in a ruminant feed supplement provides a significant improvement in the stability of the antibiotic even in contact with water, phosphates, urea and minerals.

The foregoing feed supplement can be admixed with 20–25 pounds of grain and roughage suitable for consumption by a ruminant animal.

EXAMPLE 2

This example illustrates the preparation of a dry antibiotic premix according to the present invention.

About 150 grams of the chlortetracycline antibiotic is admixed, in the manner described in Example 1, with soya oil in an amount corresponding to about 2 parts by weight oil per part by weight antibiotic in the premix. The mixture is thoroughly agitated to insure uniform distribution. Excess oil is drained from the coated premix, leaving the antibiotic with about 5 percent by weight of the soya oil.

Thereafter, the coated premix particles are then admixed with about 5 grams of diatomaceous earth (Celite 21), and the resulting mixture is mixed to insure uniform distribution of the diatomaceous earth throughout. The resulting mixture is free flowing, and can be used in the preparation of pelletized feed supplements in a conventional manner.

The chlortetracycline is found to have excellent stability, even at the elevated temperature incurred in the pelletizing operation.

EXAMPLE 3

The procedure of Example 1 is repeated using an oxytetra-cycline antibiotic premix and corn oil. In this example, the corn oil is applied in an amount corresponding to about 20 parts by weight oil per part of antibiotic contained in the premix.

EXAMPLE 4

The procedure of Example 1 is again repeated using 150 grams of a premix containing about 20 percent zinc bacitracin and 200 grams of soya oil. Again comparable results are obtained when the coated antibiotic is formulated into a feed supplement of the type described in Example 1.

It will be apparent from the foregoing that I have provided a new and improved antibiotic composition which has the necessary stability against the deleterious effects of heat, moisture, and various chemicals with which the antibiotics are frequently incorporated in solid or liquid feed supplement compositions. The concept of the present invention makes use of a simple and expensive method for coating the antibiotic particles which renders the particle virtually independent of the pH of its environment as well as the materials described.

It will be understood that various modifications and changes can be made in the details of procedure, formulation and use without departing from the spirit of the invention, especially as defined in the following claims.

I claim:

1. An improved liquid ruminant feed supplement containing an antibiotic premix slurry of antibiotic particles coated against loss of potency, said antibiotic being subject to loss of potency in said supplement, if uncoated, said ruminant feed supplement further containing, in addition to the antibiotic, water, urea or molasses and mixtures of urea and molasses, salt, $Na_2SO_4$, vitamins and trace minerals solubilized with ammonium polyphosphate, said antibiotic particles being coated with 0.1 to 25 percent by weight of a glyceride selected from the group consisting of mono-, di- and triglyceride esters formed of glycerol and a fatty acid containing 10 to 30 carbon atoms which does not interfere with the availability of the antibiotic in the ruminant.

2. A feed supplement as defined in claim 1 wherein the glyceride is in the form of a vegetable oil selected from the group consisting of corn oil, soya oil, linseed oil, peanut oil, sesame oil, grapeseed oil and poppyseed oil.

3. A feed supplement as defined in claim 1, wherein the glyceride is in the form of soya oil.

4. A feed supplement as defined in claim 1 wherein the antibiotic is selected from the group consisting of tetracycline, oxytetracycline, chlortetracycline, bromotetracycline, and acid and basic salts thereof, bacitracin and salts thereof.

5. A feed supplement as defined in claim 1 wherein the coating on the premix slurry includes an inert carrier having a high surface area.

* * * * *